US011969765B2

(12) United States Patent
Kawamura et al.

(10) Patent No.: US 11,969,765 B2
(45) Date of Patent: Apr. 30, 2024

(54) OPTICAL SORTER

(71) Applicant: SATAKE CORPORATION, Tokyo (JP)

(72) Inventors: Yoichi Kawamura, Tokyo (JP); Takuya Nishida, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 17/792,848

(22) PCT Filed: Dec. 23, 2020

(86) PCT No.: PCT/JP2020/048094
§ 371 (c)(1),
(2) Date: Jul. 14, 2022

(87) PCT Pub. No.: WO2021/145174
PCT Pub. Date: Jul. 22, 2021

(65) Prior Publication Data

US 2023/0045423 A1 Feb. 9, 2023

(30) Foreign Application Priority Data

Jan. 17, 2020 (JP) ................................ 2020-005723

(51) Int. Cl.
*B07C 5/342* (2006.01)

(52) U.S. Cl.
CPC ........ *B07C 5/3422* (2013.01); *B07C 2501/00* (2013.01)

(58) Field of Classification Search
CPC ..... B07C 5/3422; B07C 5/3425; B07C 5/366; B07C 5/342; B07C 2501/00;
(Continued)

(56) References Cited

U.S. PATENT DOCUMENTS 4,426,005 A * 1/1984 Satake .................... B07C 5/366 209/581
4,630,736 A * 12/1986 Maughan ................ B07C 5/366 209/587

(Continued)

FOREIGN PATENT DOCUMENTS

JP H08-252535 A 10/1996
JP 2009-50760 A 3/2009

(Continued)

*Primary Examiner* — Gene O Crawford
*Assistant Examiner* — Muhammad Awais
(74) *Attorney, Agent, or Firm* — Faegre Drinker Biddle & Reath LLP

(57) ABSTRACT

Included are a chute arranged in an inclined manner to allow sorting targets to flow downward, optical detection means for detecting the sorting targets at a detection position, and ejector means for sorting and removing the sorting targets based on a result of detection of the optical detection means. The chute is provided with an optical detection slit in a direction orthogonal to a flow-down direction of the sorting targets, a slit width of the optical detection slit is adjustable, and the optical detection means images the sorting targets flowing downward on the chute with the imaging means at a position where the optical detection slit is provided as the detection position.

11 Claims, 7 Drawing Sheets

(58) Field of Classification Search
CPC ... B07C 2501/0018; B07C 5/36; B07C 5/361; B07C 5/363; B07C 5/365; B07C 5/368; B65G 11/00–206
USPC .................................................... 209/44, 580
See application file for complete search history.

(56) References Cited

U.S. PATENT DOCUMENTS

| | | | | |
|---|---|---|---|---|
| 4,699,273 | A * | 10/1987 | Suggi-Liverani | B07C 5/3425 209/580 |
| 4,848,590 | A * | 7/1989 | Kelly | B07C 5/3427 209/564 |
| 5,791,489 | A * | 8/1998 | Leifeld | D01B 3/025 209/567 |
| 2007/0012604 | A1 * | 1/2007 | Basford | B07C 5/368 209/644 |
| 2009/0050540 | A1 | 2/2009 | Imai et al. | |
| 2010/0096300 | A1 * | 4/2010 | Mills | B65G 11/083 209/655 |
| 2010/0213106 | A1 * | 8/2010 | Dal Ben | B07C 5/36 209/552 |

FOREIGN PATENT DOCUMENTS

| | | | | |
|---|---|---|---|---|
| JP | 2011-98255 | A | | 5/2011 |
| JP | 2011098255 | A | * | 5/2011 |
| JP | 2013-17918 | A | | 1/2013 |
| JP | 2013017918 | A | * | 1/2013 |

* cited by examiner

[FIG. 1]
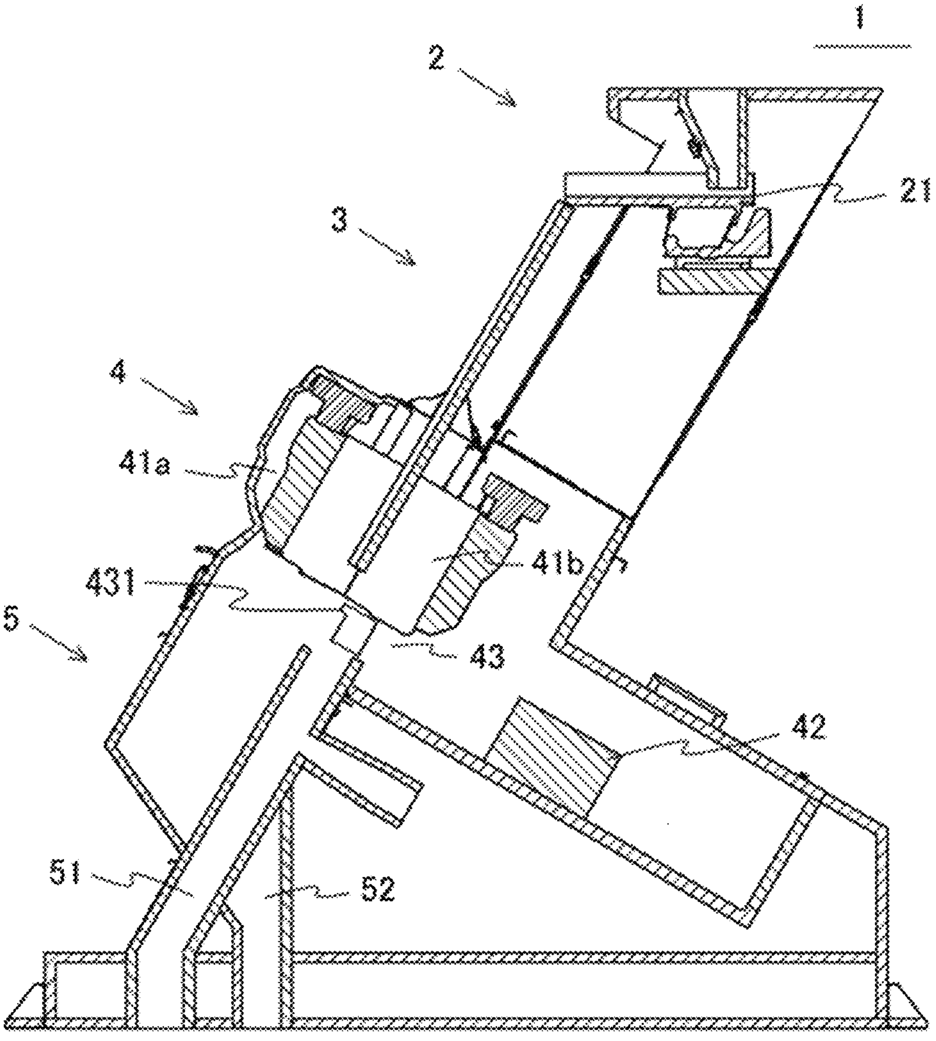

[FIG. 2]
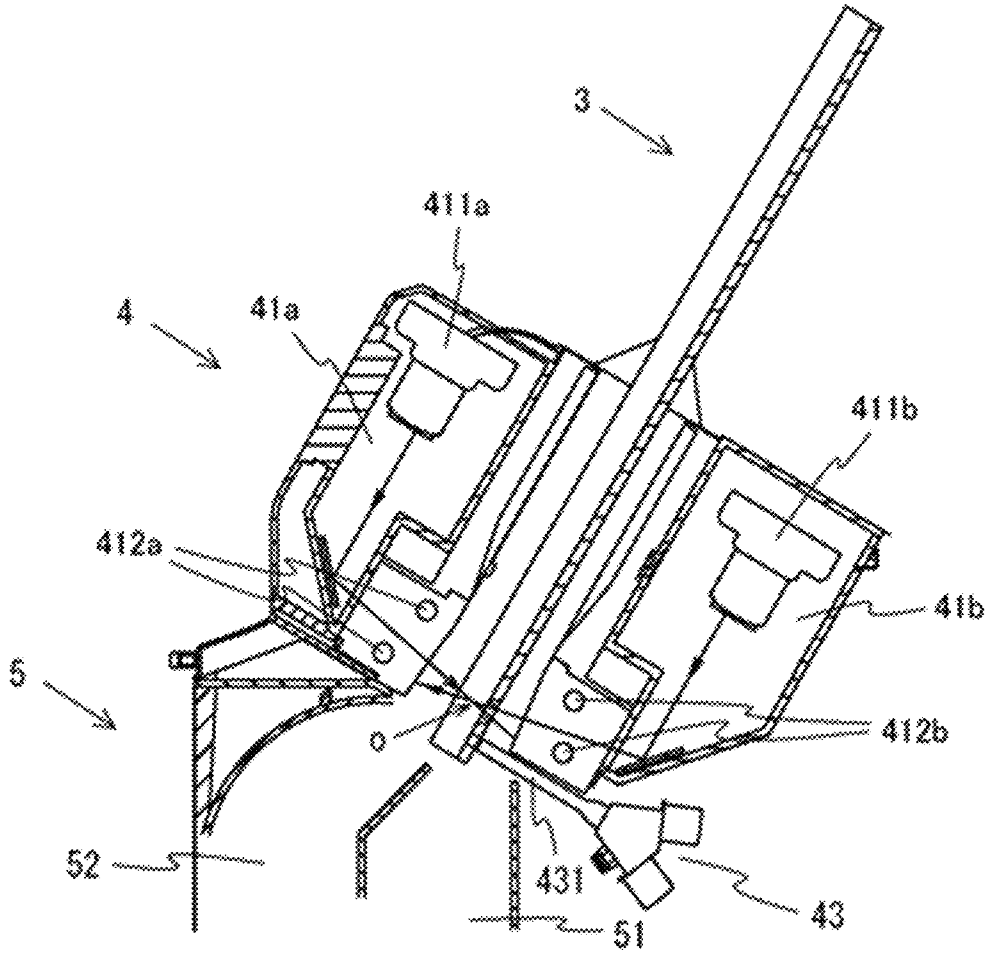

[FIG. 3]
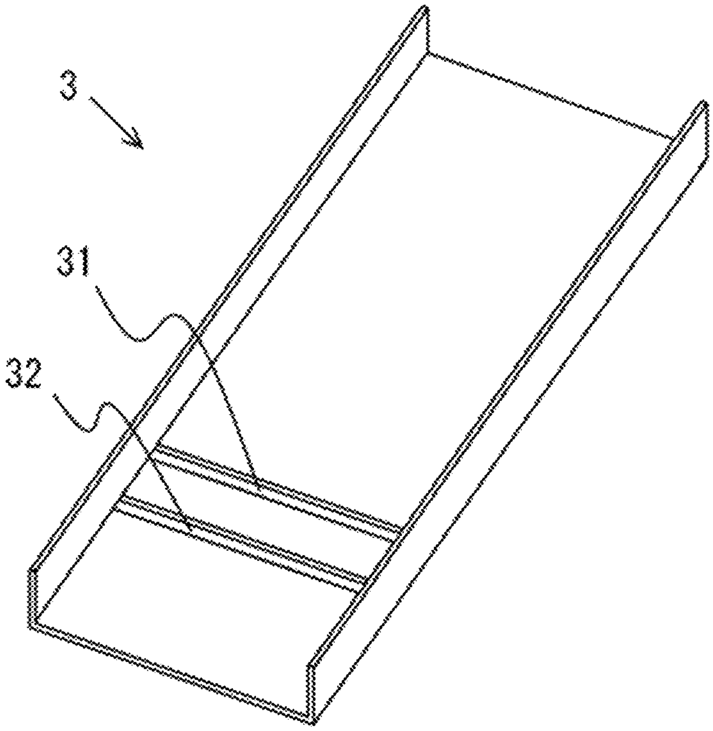

[FIG. 4]
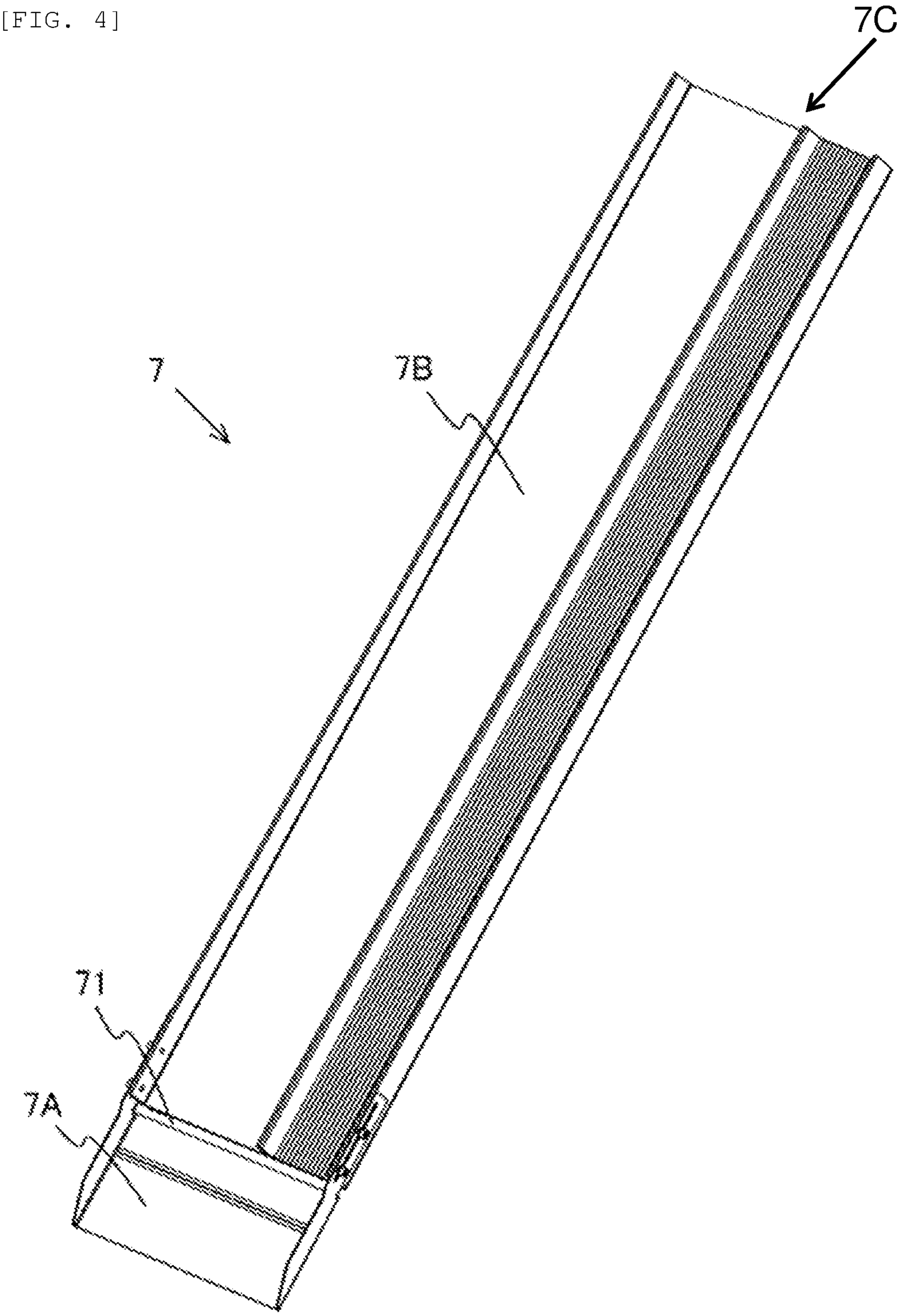

[FIG. 5]
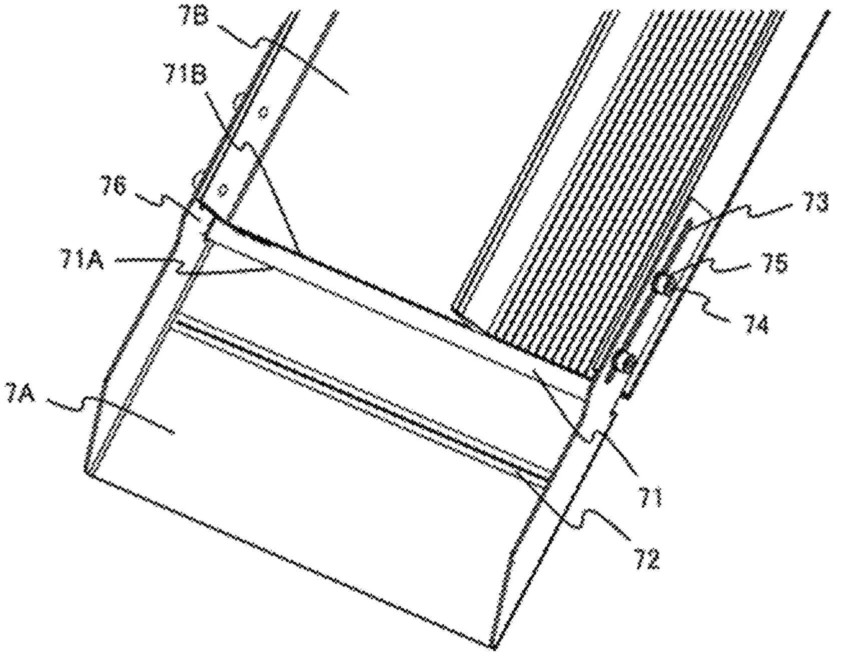
[FIG. 6]
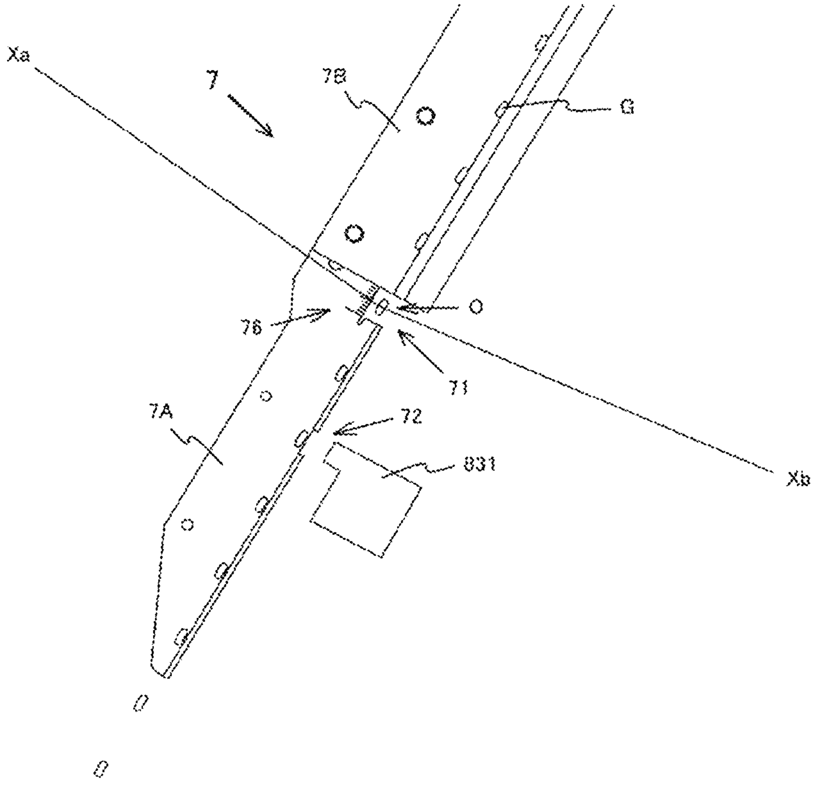

[FIG. 7]
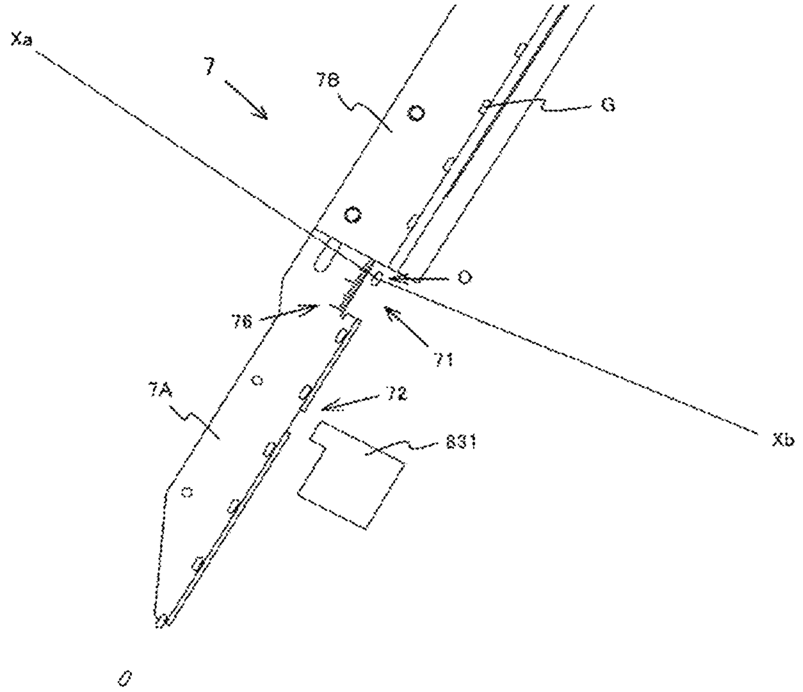
[FIG. 8]
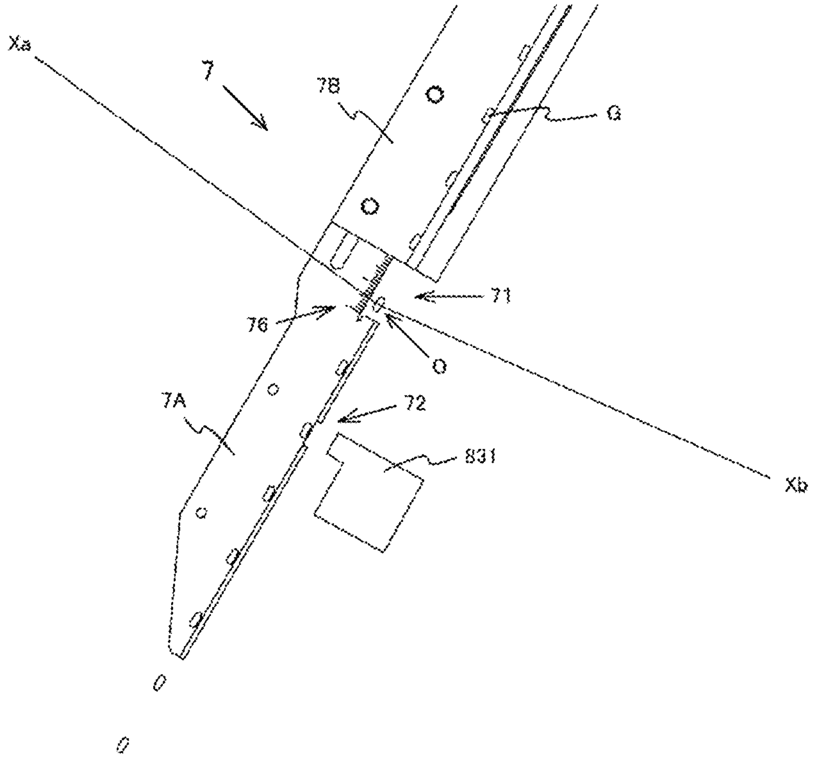

[FIG. 9]
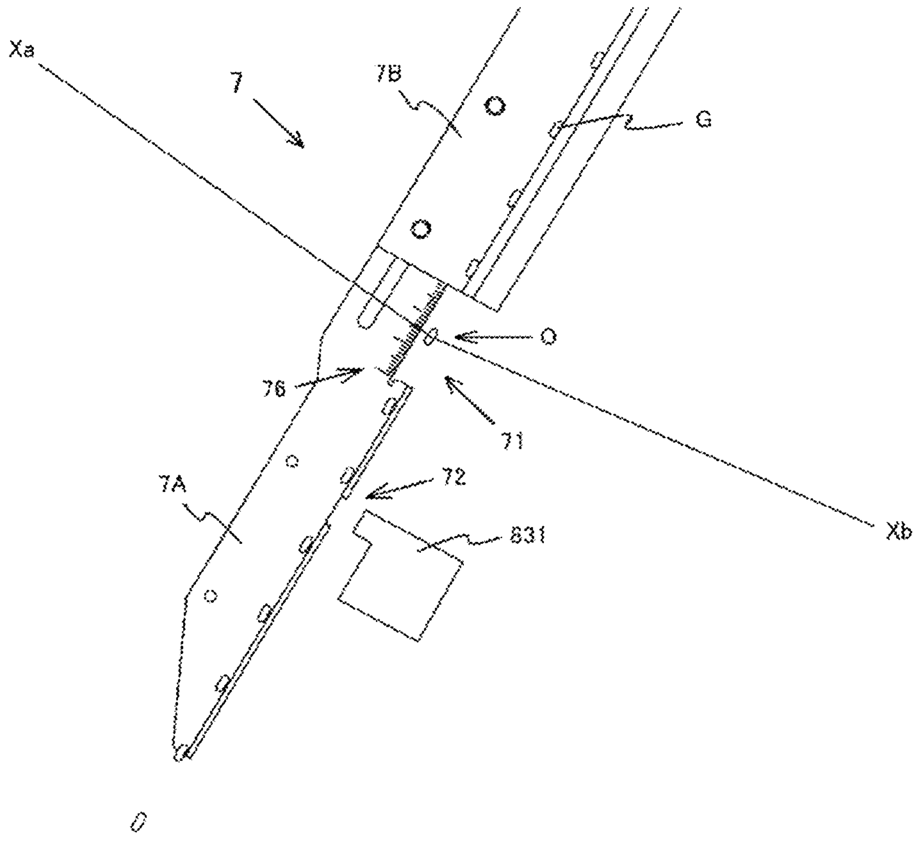

OPTICAL SORTER

CROSS REFERENCE TO RELATED APPLICATIONS

This application is a National Stage of International Application No. PCT/JP2020/048094, filed Dec. 23, 2020, and claims the benefit of Japanese Patent Application No. 2020-005723, filed Jan. 17, 2020, the entire contents of each of which are incorporated herein by reference.

TECHNICAL FIELD

The present invention relates to an optical sorter for sorting grains.

BACKGROUND ART

Conventionally, there is known an optical sorter that sorts raw material including kernels, such as rice or wheat, resin pellets, coffee beans, or other grains, into non-defective ones and defective ones based on color, for example, or determines and removes foreign matter mixed in raw material based on color, for example (see Patent Literature 1 and Patent Literature 2).

The optical sorter described in each of Patent Literatures 1 and 2 includes an inclined chute, and is configured such that grains falling from the lower end of the chute along a constant path are irradiated with light from a light source, and then reflected light or transmitted light from the grains is received by a sensor so that detective grains, foreign matter, and the like are detected. Then, the detected detective grains, foreign matter, and the like are blown away by an ejector so that the grains are sorted into non-defective grains and defective grains.

By the way, in the aforementioned optical sorter, grains falling from the lower end of the chute include grains that do not fall along a constant fall-down path due to the difference in the shape or size of the grains, difference in the flying attitude of the grains in the air, and the like. In such a case, it would be impossible to detect defective grains, foreign matter, and the like with high accuracy, which may influence sorting performance.

In response, the Applicant of the present application provided the chute with an optical detection slit at a detection position for grains. Then, the Applicant proposed an optical sorter in which grains flowing downward on the chute are irradiated with light, and then, reflected light or transmitted light from the grains is received by a sensor so that defective grains, foreign matter, and the like are detected (see Japanese Patent Application No. 2019-209821; hereinafter referred to as a "prior invention").

According to the aforementioned optical sorter of the prior invention, grains that always flow downward on the chute along a constant path can be detected. Thus, it is possible to detect defective grains, foreign matter, and the like with higher accuracy than with the conventional optical sorter, and thus improve sorting performance.

However, in the aforementioned optical sorter of the prior invention, the edge of the optical detection slit may become a shadow depending on the size of grains as raw material, and in such a case, the amount of light needed to detect grains may become insufficient, which may result in sorting failures.

CITATION LIST

Patent Literature

[Patent Literature 1] Japanese Patent Laid-Open No. 8-252535

[Patent Literature 2] Japanese Patent Laid-Open No. 2009-50760

SUMMARY OF INVENTION

Technical Problem

In view of the foregoing, it is an object of the present invention to provide an optical sorter that detects defective grains of sorting targets, foreign matter, and the like with high accuracy and thus has improved sorting performance, and further secures the amount of light needed to detect grains as sorting targets even when the size of the grains as the sorting targets is changed, thereby preventing sorting failures due to the shortage of the amount of light.

Solution to Problem

To achieve the aforementioned object, the present invention provides an optical sorter including a chute arranged in an inclined manner to allow sorting targets to flow downward; optical detection means for detecting the sorting targets at a detection position; and ejector means for sorting and removing the sorting targets based on a result of detection of the optical detection means, in which the optical detection means includes illumination means for illuminating the detection position, and imaging means for imaging the sorting targets at the detection position, the chute is provided with an optical detection slit in a direction orthogonal to a flow-down direction of the sorting targets, a slit width of the optical detection slit is adjustable, and the optical detection means illuminates the sorting targets flowing downward on the chute with the illumination means at a position where the optical detection slit is provided as the detection position, and images the sorting targets illuminated by the illumination means with the imaging means.

In the present invention, the chute preferably includes a first chute portion and a second chute portion located on an upstream side of the first chute portion, the first chute portion and the second chute portion preferably have parallel flow-down faces along the flow-down direction of the sorting targets, the optical detection slit is preferably formed between the first chute portion and the second chute portion such that a lower slit edge is formed by the first chute portion and an upper slit edge is formed by the second chute portion, the first chute portion and/or the second chute portion are/is preferably provided such that a vertical position of the first chute portion and/or the second chute portion along the flow-down direction of the sorting targets is adjustable, and the slit width of the optical detection slit is preferably adjustable by adjusting the vertical position of the first chute portion and/or the second chute portion.

In the present invention, the chute preferably includes a first chute portion and a second chute portion located on an upstream side of the first chute portion, the first chute portion and the second chute portion preferably have parallel flow-down faces along the flow-down direction of the sorting targets, the optical detection slit is preferably formed between the first chute portion and the second chute portion such that a lower slit edge is formed by the first chute portion and an upper slit edge is formed by the second chute portion, the first chute portion is preferably attached to the second chute portion such that a vertical position of the first chute portion along the flow-down direction of the sorting targets is adjustable, and the slit width of the optical detection slit is preferably adjustable by adjusting the vertical position of the first chute portion.

In the present invention, the first chute portion is preferably attached to the second chute portion in a vertically slidable manner along the flow-down direction of the sorting targets, and the slit width of the optical detection slit is preferably adjustable by sliding the first chute portion and thus adjusting the vertical position of the first chute portion.

In the present invention, the first chute portion is preferably provided with a scale having the lower slit edge as a base point such that the scale extends to an upstream side along the flow-down direction of the sorting targets, and the slit width of the optical detection slit is preferably adjustable with reference to the scale.

In the present invention, the second chute portion is preferably attached to the sorter such that a vertical position of the second chute portion along the flow-down direction of the sorting targets is adjustable, and a position of the upper slit edge of the optical detection slit is preferably adjustable by adjusting the vertical position of the second chute portion.

Herein, the portion of the sorter to which the second chute portion is attached includes, for example, a frame of the body of the sorter as well as any component of the sorter to which the second chute portion can be attached either directly or indirectly such that the vertical position of the second chute portion along the flow-down direction of the sorting targets is adjustable.

In the present invention, the second chute portion is preferably attached to the sorter in a vertically slidable manner along the flow-down direction of the sorting targets, and the position of the upper slit edge of the optical detection slit is preferably adjustable by sliding the second chute portion and thus adjusting the vertical position of the second chute portion.

In the present invention, the chute preferably further includes a third chute portion located on an upstream side of the second chute portion, the second chute portion and the third chute portion preferably have parallel flow-down faces along the flow-down direction of the sorting targets, the second chute portion is preferably attached to the third chute portion so that a vertical position of the second chute portion along the flow-down direction of the sorting targets is adjustable, and a position of the upper slit edge of the optical detection slit is preferably adjustable by adjusting the vertical position of the second chute portion.

In the present invention, the second chute portion is preferably attached to the third chute portion in a vertically slidable manner along the flow-down direction of the sorting targets, and the position of the upper slit edge of the optical detection slit is preferably adjustable by sliding the second chute portion and thus adjusting the vertical position of the second chute portion.

In the present invention, the chute preferably includes a first chute portion and a second chute portion located on an upstream side of the first chute portion, the first chute portion and the second chute portion preferably have parallel flow-down faces along the flow-down direction of the sorting targets, the optical detection slit is preferably formed between the first chute portion and the second chute portion such that a lower slit edge is formed by the first chute portion and an upper slit edge is formed by the second chute portion, the first chute portion is preferably attached to the sorter such that a vertical position of the first chute portion along the flow-down direction of the sorting targets is adjustable, and/or the second chute portion is preferably attached to the sorter such that a vertical position of the second chute portion along the flow-down direction of the sorting targets is adjustable, and the slit width of the optical detection slit is preferably adjustable by adjusting the vertical position of the first chute portion, and/or by adjusting the vertical position of the second chute portion.

Herein, the portion of the sorter to which the first chute portion and/or the second chute portion are/is attached includes, for example, a frame of the body of the sorter as well as any component of the sorter to which the first chute portion and/or the second chute portion can be attached either directly or indirectly such that the vertical position of the first chute portion and/or the second chute portion along the flow-down direction of the sorting targets is adjustable.

In the present invention, the first chute portion is preferably attached to the sorter in a vertically slidable manner along the flow-down direction of the sorting targets, and/or the second chute portion is preferably attached to the sorter in a vertically slidable manner along the flow-down direction of the sorting targets, and the slit width of the optical detection slit is preferably adjustable by sliding the first chute portion and thus adjusting the vertical position of the first chute portion, and/or by sliding the second chute portion and thus adjusting the vertical position of the second chute portion.

In the present invention, the optical sorter preferably further includes a discharge hopper that separately discharges the sorting targets sorted by the ejector means, and the first chute portion is preferably attached to the discharge hopper such that the vertical position of the first chute portion along the flow-down direction of the sorting targets is adjustable.

In the present invention, the first chute portion is preferably attached to the discharge hopper in a vertically slidable manner along the flow-down direction of the sorting targets.

In the present invention, the chute preferably includes a first chute portion and a second chute portion located on an upstream side of the first chute portion, the first chute portion and the second chute portion preferably have parallel flow-down faces along the flow-down direction of the sorting targets, the optical detection slit is preferably formed between the first chute portion and the second chute portion such that a lower slit edge is formed by the first chute portion and an upper slit edge is formed by the second chute portion, the chute preferably further includes a third chute portion located on an upstream side of the second chute portion, the second chute portion and the third chute portion preferably have parallel flow-down faces along the flow-down direction of the sorting targets, the first chute portion is preferably attached to the sorter such that a vertical position of the first chute portion along the flow-down direction of the sorting targets is adjustable, and/or the second chute portion is preferably attached to the third chute portion such that a vertical position of the second chute portion along the flow-down direction of the sorting targets is adjustable, and the slit width of the optical detection slit is preferably adjustable by adjusting the vertical position of the first chute portion, and/or by adjusting the vertical position of the second chute portion.

Herein, the portion of the sorter to which the first chute portion is attached includes, for example, a frame of the body of the sorter as well as any component of the sorter to which the first chute portion can be attached either directly or indirectly such that the vertical position of the first chute portion along the flow-down direction of the sorting targets is adjustable.

In the present invention, the first chute portion is preferably attached to the sorter in a vertically slidable manner along the flow-down direction of the sorting targets, and/or the second chute portion is preferably attached to the third chute portion in a vertically slidable manner along the flow-down direction of the sorting targets, and the slit width of the optical detection slit is preferably adjustable by sliding the first chute portion and thus adjusting the vertical position of the first chute portion, and/or by sliding the second chute portion and thus adjusting the vertical position of the second chute portion.

In the present invention, the optical sorter preferably further includes a discharge hopper that separately discharges the sorting targets sorted by the ejector means, and the first chute portion is preferably attached to the discharge hopper such that the vertical position of the first chute portion along the flow-down direction of the sorting targets is adjustable.

In the present invention, the first chute portion is preferably attached to the discharge hopper in a vertically slidable manner along the flow-down direction of the sorting targets.

In the present invention, the parallel flow-down faces of the first chute portion and the second chute portion are preferably provided with a step such that the flow-down face of the first chute portion is located below the flow-down face of the second chute portion.

In the present invention, the step is preferably adjustable corresponding to the slit width of the optical detection slit.

In the present invention, the ejector means preferably includes an ejector nozzle that selectively blasts air from a plurality of nozzle holes, the first chute portion is preferably provided with a sorting removal slit on a downstream side of the optical detection slit in a direction orthogonal to the flow-down direction of the sorting targets, and the ejector nozzle is preferably arranged on a lower face side of the first chute portion such that a tip end of the nozzle faces the sorting removal slit, and removes the sorting targets flowing downward on the first chute portion by blasting air to an upper face side of the chute.

In the present invention, the ejector nozzle is preferably arranged on the lower face side of the first chute portion with the tip end of the nozzle facing the sorting removal slit such that the tip end of the nozzle is inserted through the sorting removal slit or touches or is located close to the lower face side of the first chute portion and thus that the plurality of nozzle holes communicate with the sorting removal slit either directly or indirectly.

In the present invention, when the position of the sorting removal slit along the flow-down direction of the sorting targets is changed along with the adjustment of the slit width of the optical detection slit, the timing of blasting air from the ejector nozzle is preferably adjusted.

In the present invention, the optical detection means is preferably provided on an upper face side and/or a lower face side of the chute, and the sorting targets flowing downward on the chute are preferably illuminated by the illumination means from the upper face side and/or the lower face side of the chute, and the sorting targets illuminated by the illumination means are preferably imaged by the imaging means from the upper face side and/or the lower face side of the chute.

Advantageous Effects of Invention

In the optical sorter of the present invention, the chute is provided with an optical detection slit in a direction orthogonal to the flow-down direction of sorting targets. The optical detection means illuminates the sorting targets flowing downward on the chute with the illumination means at the position where the optical detection slit is provided as the detection position. Then, the sorting targets illuminated by the illumination means can be imaged by the imaging means. Accordingly, unlike with the conventional optical sorter that detects sorting targets falling from the lower end of the chute, it is possible to detect sorting targets that always flow downward on the chute along a constant path.

Thus, according to the optical sorter of the present invention, it is possible to detect defective grains of the sorting targets, foreign matter, and the like with higher accuracy than with the conventional optical sorter. Thus, sorting performance can be improved.

In the optical sorter of the present invention, since the slit width of the optical detection slit is adjustable, the slit width can be adjusted to a width that is suitable for the size of the sorting targets.

Thus, according to the optical sorter of the present invention, it is possible to secure the amount of light needed to detect the sorting targets as raw material even when the size of the sorting targets is changed, and thus prevent sorting failures due to the shortage of the amount of light.

In the optical sorter of the present invention, the chute includes a first chute portion and a second chute portion located on the upstream side of the first chute portion. In addition, the first chute portion and the second chute portion have parallel flow-down faces along the flow-down direction of the sorting targets. The optical detection slit is formed between the first chute portion and the second chute portion such that a lower slit edge is formed by the first chute portion and an upper slit edge is formed by the second chute portion. The first chute portion and/or the second chute portion are provided such that the vertical position thereof along the flow-down direction of the sorting targets is adjustable. According to such a configuration, the slit width of the optical detection slit is adjustable by adjusting the vertical position of the first chute portion and/or the second chute portion. Thus, the slit width can be freely adjusted such that it becomes wider toward the upstream side, the downstream side, or both the upstream side and the downstream side.

In the optical sorter of the present invention, the first chute portion is attached to the second chute portion in a vertically slidable manner along the flow-down direction of the sorting targets. Since the slit width of the optical detection slit is adjustable by sliding the first chute portion and thus adjusting the vertical position of the first chute portion, the slit width can be easily adjusted.

In the optical sorter of the present invention, the first chute portion is provided with a scale having the lower slit edge as a base point such that the scale extends to the upstream side along the flow-down direction of the sorting targets. Since the slit width of the optical detection slit is adjustable with reference to the scale, the slit width can be easily adjusted.

In the optical sorter of the present invention, since the parallel flow-down faces of the first chute portion and the second chute portion are provided with a step so that the flow-down face of the first chute portion is located below the flow-down face of the second chute portion, it is possible to prevent the sorting targets from bouncing by colliding with the lower slit edge.

In the present invention, the ejector means includes an ejector nozzle that selectively blasts air from a plurality of nozzle holes. The first chute portion is provided with a sorting removal slit on the downstream side of the optical detection slit in a direction orthogonal to the flow-down direction of the sorting targets. The ejector nozzle is arranged on the lower face side of the first chute portion such that the tip end of the nozzle faces the sorting removal slit. Thus, the ejector nozzle can remove the sorting targets flowing downward on the flow-down face of the first chute portion by blasting air to the upper face side of the chute. Accordingly, unlike with the conventional optical sorter that sorts and removes sorting targets falling from the lower end of the chute, it is possible to sort and remove sorting targets that always flow downward on the chute along a constant path.

Thus, according to the optical sorter of the present invention, it is possible to sort and remove defective grains of sorting targets, foreign matter, and the like with higher accuracy than with the conventional optical sorter, and thus further improve sorting performance.

BRIEF DESCRIPTION OF DRAWINGS

FIG. 1 is a sectional side view of an optical sorter.

FIG. 2 is an illustration view of an optical sorting unit of a prior invention.

FIG. 3 is a perspective view of a chute of the prior invention.

FIG. 4 is a perspective view of a chute according to Embodiment 1 of the present invention.

FIG. 5 is an enlarged view of a main part of FIG. 4.

FIG. 6 is a sectional side view of FIG. 5.

FIG. 7 is an illustration view of an example in which the slit width of an optical detection slit in FIG. 6 is adjusted.

FIG. 8 is an illustration view of an example in which the slit width of the optical detection slit in FIG. 6 is adjusted.

FIG. 9 is an illustration view of an example in which the slit width of the optical detection slit in FIG. 6 is adjusted.

DESCRIPTION OF EMBODIMENTS

Embodiments of the present invention will be described with reference to the drawings.

[Optical Sorter]

FIG. 1 is a sectional side view illustrating an example of an optical sorter. In each embodiment of the present invention, an optical sorter 1 includes a grain supply unit 2 that supplies grains as raw material, a chute 3 that is arranged in an inclined manner and thus allows grains to flow downward, an optical sorting unit 4 that detects grains flowing downward on the chute 3 and sorts the grains into non-defective grains and defective grains based on the results of detection, and a discharge hopper 5 that separately discharges the grains sorted into non-defective grains and defective grains by the optical sorting unit 4.

The grain supply unit 2 includes a raw material tank (not illustrated), and a vibrating feeder 21 that feeds grains stored in the raw material tank to the chute 3.

The chute 3 has a predetermined width, and is arranged in an inclined manner at a position below the tip end side of the vibrating feeder 21. The chute 3 can allow grains fed from the vibrating feeder 21 to flow downward by gravity.

The optical sorting unit 4 includes a pair of optical detection devices 41*a* and 41*b* arranged on the upper face side and the lower face side of the chute 3, a determination device 42 that determines if the grains are non-defective grains or defective grains based on imaging signals obtained with the optical detection devices 41*a* and 41*b*, and an ejector device 43 that removes the defective grains based on the results of determination of the determination device 42 and thus sorts the grains into the non-defective grains and the defective grains.

The discharge hopper 5 includes a non-defective-grain discharge passage 51 and a defective-grain discharge passage 52 that separately discharge the grains sorted into the non-defective grains and the defective grains by the ejector device 43.

In the optical sorter 1, grains stored in the raw material tank of the grain supply unit 2 are continuously fed to the chute 3 by the vibrating feeder 21. The fed grains flow continuously downward on the surface of the chute 3 by gravity while spreading in the width direction of the chute 3.

The grains flowing downward on the chute 3 are imaged by imaging means of the optical detection devices 41*a* and 41*b* in the optical sorting unit 4. The determination device 42 compares the signal levels, such as the amounts of light or color components, of the image signals obtained with the imaging means with a threshold. The grains are determined to be non-defective grains or defective grains based on the results of comparison with the threshold. Then, the determination device 42 sends a removal signal to the ejector device 43 so as to allow the defective grains to be removed with air blasted from the ejector device 43, and thus, the grains are sorted into the non-defective grains and the defective grains.

Then, the grains sorted as the non-defective grains are discharged from the non-defective-grain discharge passage 51 of the discharge hopper 5, and the grains sorted as the defective grains are discharged from the defective-grain discharge passage 52 of the discharge hopper 5.

[Optical Sorting Unit]

FIG. 2 is an illustration view of an optical sorting unit of a prior invention. FIG. 3 is a perspective view of a chute of the prior invention.

In an optical sorting unit 4 of the prior invention, a chute 3 is provided with an optical detection slit 31, which is open continuously in the width direction of the chute 3, in a direction orthogonal to the flow-down direction of grains.

The chute 3 is also provided with a sorting removal slit 32, which is open continuously in the width direction of the chute 3, in a direction orthogonal to the flow-down direction of grains on the downstream side of the optical detection slit 31.

In the optical sorting unit 4, each of the optical detection devices 41*a* and 41*b* incorporates a line sensor or an area sensor, such as a CCD, that can correspond to grains flowing downward on the chute 3 while spreading in the width direction thereof. The optical detection devices 41*a* and 41*b* respectively include imaging means 411*a* and 411*b*, such as CCD cameras, that can receive light in the wavelength range of near infrared rays (NIR), visible rays, or ultraviolet rays, for example; illumination means 412*a* and 412*b*, such as LED light sources or fluorescent lamps, that illuminate a detection position O of the chute 3 on which grains flow downward; and a background portion that serves as a background when grains are imaged by the imaging means 411*a* and 411*b* at the detection position O.

The ejector device 43 includes an ejector nozzle 431 corresponding to grains flowing downward on the chute 3 while spreading in the width direction thereof as with the optical detection devices 41*a* and 41*b*. The ejector nozzle 431 has a plurality of nozzle holes formed therein in the width direction of the chute 3, and one or more of the nozzle holes is/are selected so that air can be blasted therefrom. The ejector device 43 also includes an ejector drive device (not illustrated) that allows air to be blasted from the ejector nozzle 431 based on a removal signal sent from the determination device.

The optical detection devices 41*a* and 41*b* are arranged so as to have as the detection position O the position of the chute 3 in which the optical detection slit 31 is provided. The optical detection devices 41*a* and 41*b* respectively allow grains flowing downward on the chute 3 to be illuminated by the illumination means 412*a* and 412*b* at the detection position O from the upper face side and the lower face side of the chute and then be imaged by the imaging means 411*a* and 411*b*.

The ejector device 43 is arranged such that the tip end of the ejector nozzle 431 touches or is located close to the lower face side of the chute 3. The plurality of nozzle holes of the ejector nozzle 431 are arranged such that they communicate with the sorting removal slit 32 either directly or indirectly so that the grains determined to be defective among the grains flowing downward on the chute 3 are removed with air blasted to the upper face side of the chute 3 via the sorting removal slit 32.

Then, the grains determined to be non-defective among the grains flowing downward on the chute 3 are discharged from the non-defective-grain discharge passage 51 of the discharge hopper 5. The grains determined to be defective among the grains flowing downward on the chute 3 are discharged from the defective-grain discharge passage 52 of the discharge hopper 5.

In the aforementioned description, each of the imaging means 411*a* and 411*b* incorporates a line sensor or an area sensor. When each of the imaging means 411*a* and 411*b* incorporates a line sensor, it is possible to detect defective grains and the like with higher accuracy than when it incorporates an area sensor even if the slit width of the optical detection slit 31 is narrow.

In the aforementioned description, an LED light source, a fluorescent lamp, or the like is used for each of the illumination means 412*a* and 412*b*. When an LED light source is used, dispersion of light is unlikely to occur due to the characteristics of the LED light source. Thus, it is possible to secure a sufficient amount of light for imaging grains with the imaging means 411*a* and 411*b* in comparison with when a fluorescent lamp is used even if the slit width of the optical detection slit 31 is narrow.

However, even when a fluorescent lamp is used for each of the illumination means 412*a* and 412*b*, it is possible to obtain advantageous effects similar to those obtained when an LED light source is used, by condensing the light.

The slit width of the optical detection slit 31 provided in the chute 3 can be set taking into consideration the size of each sensor element, the amount of light received by each sensor, the inclination angle of the chute, the weight or size of grains flowing downward on the chute, and the like. For example, when the grains are rice grains, the slit width of the optical detection slit 31 can be set to 1 to 2 mm.

The slit width of the sorting removal slit 32 provided in the chute 3 can be set to a width that allows defective grains to be reliably removed.

In the aforementioned description, the sorting removal slit 32 is formed such that it is open continuously in the width direction of the chute 3, but may also be formed such that it is open intermittently in the width direction of the chute 3 corresponding to the plurality of nozzle holes of the ejector nozzle 431.

Embodiments of the Present Invention

In the optical sorter according to each embodiment of the present invention, the slit width of the optical detection slit 31 provided in the chute 3 of the prior invention is adjustable. The other configurations are as described with reference to FIGS. 1 and 2. Thus, the description thereof is omitted herein.

Embodiment 1

Example 1

FIG. 4 illustrates a perspective view of a chute according to Embodiment 1 of the present invention. FIG. 5 illustrates an enlarged view of a main part of FIG. 4. FIG. 6 illustrates a sectional side view of FIG. 5.

In Embodiment 1 of the present invention, a chute 7 includes a first chute portion 7A and a second chute portion 7B located on the upstream side of the first chute portion 7A.

The first chute portion 7A and the second chute portion 7B have parallel flow-down faces along the flow-down direction of grains.

The chute 7 has a lower slit edge 71A formed at the upper end of the first chute portion 7A, and has an upper slit edge 71B formed at the lower end of the second chute portion 7B. In addition, an optical detection slit 71 is formed between the upper end of the first chute portion 7A and the lower end of the second chute portion 7B in a direction orthogonal to the flow-down direction of grains.

As illustrated in FIG. 5, each of opposite sidewalls of the first chute portion 7A has a long hole 73 formed therein. Each of opposite sidewalls of the second chute portion 7B is provided with two screws 74 adapted to be inserted through each long hole 73. In addition, a nut 75 is attached to each screw 74 so that the second chute portion 7B and the first chute portion 7A are integrally attached together. When each nut 75 is loosened, the first chute portion 7A can be slid on the second chute portion 7B along the flow-down direction of grains.

The inner face of at least one of the sidewalls of the first chute portion 7A is provided with a scale 76, which has as the base point the lower slit edge 71A at the upper end of the first chute portion 7A, along the flow-down direction of grains such that the scale 76 extends to the upstream side.

Further, the parallel flow-down faces of the first chute portion 7A and the second chute portion 7B are provided with a step so that the flow-down face of the first chute portion 7A is located below the flow-down face of the second chute portion 7B.

In the example illustrated in FIG. 6, the position of the optical detection slit 71 is adjusted so that optical axes Xa and Xb, which respectively connect the imaging means 411*a* and 411*b*, such as CCD cameras, illustrated in FIG. 2 and the detection position O on the chute 7, pass through the center of the slit in the flow-down direction of grains G.

FIG. 7 illustrates an example in which the slit width of the optical detection slit in FIG. 6 is adjusted. That is, FIG. 7 is an illustration view of an example in which the slit width is adjusted such that it becomes wider toward the downstream side with respect to the detection position O (i.e., an intersection of the optical axis Xa and the optical axis Xb).

In Embodiment 1 of the present invention, the slit width of the optical detection slit 71 can be adjusted by adjusting the position of the lower slit edge 71A by sliding the first chute portion 7A on the second chute portion 7B and thus adjusting the vertical position of the first chute portion 7A.

When the slit width is adjusted, since the first chute portion 7A is provided with the scale 76 having the lower slit edge 71A as the base point, it is possible to easily adjust the slit width while seeing the scale 76.

Since the parallel flow-down faces for grains of the first chute portion 7A and the second chute portion 7B are provided with a step so that the flow-down face of the first chute portion 7A is located below the flow-down face of the second chute portion 7B, it is possible to prevent the grains from bouncing by colliding with the lower slit edge 71A.

Such a step is preferably adjusted corresponding to the slit width of the optical detection slit 71.

In Embodiment 1 of the present invention, the first chute portion 7A is provided with a sorting removal slit 72 in a direction orthogonal to the flow-down direction of the grains G on the downstream side of the optical detection slit 71.

In addition, as illustrated in FIGS. 6 and 7, an ejector nozzle 831 is arranged on the lower face side of the first chute portion 7A such that the tip end of the nozzle is located close to the sorting removal slit 72.

The ejector nozzle 831 can remove the grains G flowing downward on the flow-down face of the first chute portion 7A by blasting air to the upper face side of the chute 7 via the sorting removal slit 72.

The tip end of the ejector nozzle 831 may, in addition to being located close to the sorting removal slit 72, touch the lower face side of the first chute portion 7A or be inserted through the sorting removal slit 72. Accordingly, the plurality of nozzle holes of the ejector nozzle 831 can be arranged on the lower face side of the first chute portion 7A such that they communicate with the sorting removal slit 72 either directly or indirectly.

In the example illustrated in FIG. 7, the slit width of the optical detection slit 71 is adjusted such that it becomes wider toward the downstream side. Accordingly, the position of the sorting removal slit 72 is changed to the downstream side with respect to the detection position O (i.e., the intersection of the optical axis Xa and the optical axis Xb) along the flow-down direction of the grains G. In such a case, adjusting the timing of blasting air from the ejector nozzle 831 by delaying it can remove the grains G by reliably blasting air to the upper face side of the chute 7.

In the aforementioned example, the slit width of the optical detection slit 71 is adjusted by sliding the first chute portion 7A on the second chute portion 7B and thus adjusting the vertical position of the first chute portion 7A. However, the present invention is not limited to such a method. For example, it is also possible to configure the first chute portion 7A to be attachable to and detachable from the second chute portion 7B with screws and the like, and adjust the slit width by changing the attachment position of the first chute portion 7A with respect to the second chute portion 7B.

Example 2

In Embodiment 1 of the present invention, the second chute portion 7B can be attached to the sorter in a vertically slidable manner along the flow-down direction of grains.

In the optical detection slit 71, the position of the upper slit edge 71B can be adjusted by sliding the second chute portion 7B on the sorter and thus adjusting the vertical position of the second chute portion 7B.

Herein, the portion of the sorter to which the second chute portion 7B is attached includes, for example, a frame of the body of the sorter as well as any component of the sorter to which the second chute portion 7B can be attached either directly or indirectly.

Each of FIGS. 8 and 9 illustrates an example in which the slit width of the optical detection slit in FIG. 6 is adjusted. FIG. 8 is an illustration view of an example in which the slit width is adjusted such that it becomes wider toward the upstream side with respect to the detection position O (i.e., the intersection of the optical axis Xa and the optical axis Xb). FIG. 9 is an illustration view of an example in which the slit width is adjusted such that it becomes wider toward both the upstream side and the downstream side with respect to the detection position O (i.e., the intersection of the optical axis Xa and the optical axis Xb).

In the example illustrated in FIG. 8, the second chute portion 7B of the chute 7 in the state illustrated in FIG. 7 is slid on the sorter to the upstream side.

Meanwhile, in the example illustrated in FIG. 9, the first chute portion 7A of the chute 7 in the state illustrated in FIG. 8 is further slid on the second chute portion 7B to the downstream side.

In the optical detection slit 71 of the aforementioned example, the position of the upper slit edge 71B is adjusted by sliding the second chute portion 7B on the sorter and thus adjusting the vertical position of the second chute portion 7B. However, the present invention is not limited to such a method. For example, the second chute portion 7B may be configured to be attachable to and detachable from the sorter with screws and the like, and the position of the upper slit edge 71B may be adjusted by changing the attachment position of the second chute portion 7B with respect to the sorter.

Example 3

In Embodiment 1 of the present invention, the chute 7 may include a third chute portion 7C that is located on the upstream side of the second chute portion 7B and includes a parallel flow-down face along the flow-down direction of grains.

In such a case, the second chute portion 7B can be attached to the third chute portion 7C in a vertically slidable manner along the flow-down direction of grains.

In addition, in the optical detection slit 71, the vertical position of the second chute portion 7B can be adjusted by sliding the second chute portion 7B on the third chute portion 7C. Accordingly, the position of the upper slit edge 71B can be adjusted as in Example 2.

In the aforementioned example, the position of the upper slit edge 71B of the optical detection slit 71 is adjusted by sliding the second chute portion 7B on the third chute portion 7C and thus adjusting the vertical position of the second chute portion 7B. However, the present invention is not limited to such a method. For example, the second chute portion 7B may be configured to be attachable to and detachable from the third chute portion 7C with screws and the like, and the position of the upper slit edge 71B may be adjusted by other means, for example, by changing the attachment position of the second chute portion 7B with respect to the third chute portion 7C.

Embodiment 2

An optical sorter of Embodiment 2 of the present invention differs from the aforementioned optical sorter of Embodiment 1 in that the first chute portion 7A is attached to the sorter in a vertically slidable manner along the flow-down direction of grains.

Example 4

In Embodiment 2 of the present invention, the first chute portion 7A can be attached to the sorter in a vertically slidable manner along the flow-down direction of grains.

In addition, the slit width of the optical detection slit 71 can be adjusted by adjusting the position of the lower slit edge 71A by sliding the first chute portion 7A on the sorter and thus adjusting the vertical position of the first chute portion 7A.

Herein, the portion of the sorter to which the first chute portion 7A is attached includes, for example, a frame of the body of the sorter as well as any component of the sorter to which the first chute portion 7A can be attached either directly or indirectly, such as the discharge hopper.

In the aforementioned example, the slit width of the optical detection slit 71 is adjusted by sliding the first chute portion 7A on the sorter and thus adjusting the vertical position of the first chute portion 7A. However, the present invention is not limited to such a method. For example, the first chute portion 7A may be configured to be attachable to and detachable from the sorter with screws and the like, and the slit width may be adjusted by other means, for example, by changing the attachment position of the first chute portion 7A with respect to the sorter.

Example 5

In Embodiment 2 of the present invention, the second chute portion 7B can be attached to the sorter in a vertically slidable manner along the flow-down direction of grains as in Embodiment 1 described above.

In addition, the slit width of the optical detection slit 71 can be adjusted by adjusting the position of the upper slit edge 71B by sliding the second chute portion 7B on the sorter and thus adjusting the vertical position of the second chute portion.

Herein, the sorter to which the second chute portion 7B is attached includes, for example, a frame of the body of the sorter as well as any component of the sorter to which the second chute portion 7B can be attached either directly or indirectly.

In the aforementioned example, the slit width of the optical detection slit 71 is adjusted by sliding the second chute portion 7B on the sorter and thus adjusting the vertical position of the second chute portion 7B. However, the present invention is not limited to such a method. For example, the second chute portion 7B may be configured to be attachable to and detachable from the sorter with screws and the like, and the slit width may be adjusted by other means, for example, by changing the attachment position of the second chute portion 7B with respect to the sorter.

Example 6

In Embodiment 2 of the present invention, the chute 7 may include a third chute portion 7C that is located on the upstream side of the second chute portion 7B and includes a parallel flow-down face along the flow-down direction of grains.

In such a case, the second chute portion 7B can be attached to the third chute portion 7C in a vertically slidable manner along the flow-down direction of grains.

In addition, for the optical detection slit 71, the vertical position of the second chute portion 7B is adjusted by sliding the second chute portion 7B on the third chute portion 7C. Accordingly, the slit width can be adjusted as in Example 5.

In the aforementioned example, the slit width of the optical detection slit 71 is adjusted by sliding the second chute portion 7B on the third chute portion 7C and thus adjusting the vertical position of the second chute portion 7B. However, the present invention is not limited to such a method. For example, the second chute portion 7B may be configured to be attachable to and detachable from the third chute portion 7C with screws and the like, and the slit width may be adjusted by other means, for example, by changing the attachment position of the second chute portion 7B with respect to the third chute portion 7C.

In the optical sorter of each embodiment of the present invention, the chute 7 is provided with the optical detection slit 71 in a direction orthogonal to the flow-down direction of grains. In the optical detection devices 41*a* and 41*b*, the illumination means 412*a* and 412*b* illuminate grains flowing downward on the chute 7 at the position where the optical detection slit 71 is provided as the detection position O for the grains. Further, the grains illuminated by the illumination means 412*a* and 412*b* are imaged by the imaging means 411*a* and 411*b*. Thus, unlike with the conventional optical sorter that detects grains falling from the lower end of the chute, it is possible to detect grains that always flow downward on the chute along a constant path.

According to such a configuration, the optical sorter of each embodiment of the present invention can detect defective grains, foreign matter, and the like with higher accuracy than the conventional optical sorter. Thus, sorting performance can be improved.

In the optical sorter of each embodiment of the present invention, since the slit width of the optical detection slit 71 is adjustable, the slit width can be adjusted to a width that is suitable for the size of grains.

According to such a configuration, the optical sorter of each embodiment of the present invention can secure the amount of light needed to detect grains as raw material even when the size of the grains is changed. This prevents sorting failures due to the shortage of the amount of light.

In each embodiment of the present invention, the optical detection devices 41*a* and 41*b* may be provided only on the upper face side or the lower face side of the chute.

In addition, in each embodiment of the present invention, the illumination means 412*a* and 412*b* of the optical detection devices 41*a* and 41*b* may be provided only on the upstream side or the downstream side of the detection position O.

In each embodiment of the present invention, the optical sorting unit 4 is adapted to remove defective grains, but may also remove non-defective grains so as to sort the grains into the non-defective grains and the defective grains. In addition, the optical sorting unit 4 may also remove foreign matter mixed in raw material so as to sort the raw material into grains and the foreign matter.

Each embodiment of the present invention has illustrated an example in which the ejector device 43 includes the ejector nozzle 431 and removes grains by blasting air therefrom. However, the present invention is not limited to such a method, and it is possible to provide a configuration in which grains are removed through suction using a suction apparatus, or a configuration in which grains are removed by a predetermined mechanically operated member.

Although the embodiments of the present invention have been described above, the present invention is not limited thereto, and the configuration of the present invention can be changed as appropriate within the scope of the invention.

INDUSTRIAL APPLICABILITY

The optical sorter of the present invention can detect defective grains, foreign matter, and the like with high accuracy, and thus can have improved sorting performance. In addition, the optical sorter of the present invention can secure the amount of light needed to detect grains even when the size of the grains is changed. This prevents sorting failures due to the shortage of the amount of light.

REFERENCE SIGNS LIST

1 Optical sorter
2 Grain supply unit
21 Vibrating feeder
3 Chute
31 Optical detection slit
32 Sorting removal slit
4 Optical sorting unit
41*a*, 41*b* Optical detection device
411*a*, 411*b* Imaging means
412*a*, 412*b* Illumination means
42 Determination device
43 Ejector device
431 Ejector nozzle
5 Discharge hopper
51 Non-defective-grain discharge passage (first discharge portion)
52 Defective-grain discharge passage (second discharge portion)
7 Chute
7A First chute portion
7B Second chute portion
71 Optical detection slit
71A Lower slit edge
71B Upper slit edge
72 Sorting removal slit
73 Long hole
74 Screw
75 Nut
76 Scale
831 Ejector nozzle
G Grains
O Detection position
Xa, Xb Optical axis connecting imaging means and detection position O

The invention claimed is:

1. An optical sorter comprising:
a chute arranged in an inclined manner to allow sorting targets to flow downward;
optical detection means for detecting the sorting targets at a detection position; and
ejector means for sorting and removing the sorting targets based on a result of detection of the optical detection means,
wherein:
the optical detection means includes
illumination means for illuminating the detection position, and
imaging means for imaging the sorting targets at the detection position,
the chute is provided with an optical detection slit in a direction orthogonal to a flow-down direction of the sorting targets,
a slit width of the optical detection slit is adjustable,
the optical detection means illuminates the sorting targets flowing downward on the chute with the illumination means at a position where the optical detection slit is provided as the detection position, and images the sorting targets illuminated by the illumination means with the imaging means,
the chute includes a first chute portion and a second chute portion located on an upstream side of the first chute portion,
the optical detection slit is formed between the first chute portion and the second chute portion such that a lower slit edge is formed by the first chute portion and an upper slit edge is formed by the second chute portion,
the first chute portion and/or the second chute portion are/is provided such that a vertical position of the first chute portion and/or a vertical position of the second chute portion along the flow-down direction of the sorting targets is adjustable,
the slit width of the optical detection slit is adjustable by adjusting the vertical position of the first chute portion and/or a vertical position of the second chute portion,
the first chute portion is provided with a scale having the lower slit edge as a base point such that the scale extends to an upstream side along the flow-down direction of the sorting targets, and
the slit width of the optical detection slit is adjustable with reference to the scale.

2. The optical sorter according to claim 1,
wherein:
the first chute portion and the second chute portion have parallel flow-down faces along the flow-down direction of the sorting targets,
the second chute portion is provided such that the vertical position of the second chute portion along the flow-down direction of the sorting targets is adjustable, and
the slit width of the optical detection slit is adjustable by adjusting the vertical position of the second chute portion.

3. The optical sorter according to claim 1,
wherein:
the first chute portion and the second chute portion have parallel flow-down faces along the flow-down direction of the sorting targets,
the first chute portion is attached to the second chute portion such that the vertical position of the first chute portion along the flow-down direction of the sorting targets is adjustable, and
the slit width of the optical detection slit is adjustable by adjusting the vertical position of the first chute portion.

4. The optical sorter according to claim 1,
wherein:
the first chute portion is attached to the second chute portion in a vertically slidable manner along the flow-down direction of the sorting targets, and
the slit width of the optical detection slit is adjustable by sliding the first chute portion and thus adjusting the vertical position of the first chute portion.

5. The optical sorter according to claim 1,
wherein:
the second chute portion is attached to the sorter such that a vertical position of the second chute portion along the flow-down direction of the sorting targets is adjustable, and
a position of the upper slit edge of the optical detection slit is adjustable by adjusting the vertical position of the second chute portion.

6. The optical sorter according to claim 3,
wherein:
the chute further includes a third chute portion located on an upstream side of the second chute portion,
the second chute portion and the third chute portion have parallel flow-down faces along the flow-down direction of the sorting targets, the second chute portion is attached to the third chute portion so that a vertical position of the second chute portion along the flow-down direction of the sorting targets is adjustable, and a position of the upper slit edge of the optical detection slit is adjustable by adjusting the vertical position of the second chute portion.

7. The optical sorter according to claim 1, wherein:

the first chute portion and the second chute portion have parallel flow-down faces along the flow-down direction of the sorting targets, the first chute portion is attached to the sorter such that the vertical position of the first chute portion along the flow-down direction of the sorting targets is adjustable, and/or the second chute portion is attached to the sorter such that the vertical position of the second chute portion along the flow-down direction of the sorting targets is adjustable.

8. The optical sorter according to claim 1, wherein:

the first chute portion and the second chute portion have parallel flow-down faces along the flow-down direction of the sorting targets, the chute further includes a third chute portion located on an upstream side of the second chute portion, the second chute portion and the third chute portion have parallel flow-down faces along the flow-down direction of the sorting targets, the first chute portion is attached to the sorter such that a vertical position of the first chute portion along the flow-down direction of the sorting targets is adjustable, and/or the second chute portion is attached to the third chute portion such that a vertical position of the second chute portion along the flow-down direction of the sorting targets is adjustable.

9. The optical sorter according to claim 2, wherein the parallel flow-down faces of the first chute portion and the second chute portion are provided with a step such that the flow-down face of the first chute portion is located below the flow-down face of the second chute portion.

10. The optical sorter according to claim 2, wherein:

the ejector means includes an ejector nozzle that selectively blasts air from a plurality of nozzle holes, the first chute portion is provided with a sorting removal slit on a downstream side of the optical detection slit in a direction orthogonal to the flow-down direction of the sorting targets, and the ejector nozzle is arranged on a lower face side of the first chute portion such that a tip end of the nozzle faces the sorting removal slit, and removes the sorting targets flowing downward on the first chute portion by blasting air to an upper face side of the chute.

11. The optical sorter according to claim 1, wherein:

the optical detection means is provided on an upper face side and/or a lower face side of the chute, and the sorting targets flowing downward on the chute are illuminated by the illumination means from the upper face side and/or the lower face side of the chute, and the sorting targets illuminated by the illumination means are imaged by the imaging means from the upper face side and/or the lower face side of the chute.

* * * * *